Dec. 6, 1938.    A. M. BABITCH ET AL    2,139,346
COMBINED FUEL AND AIR PUMP
Filed Dec. 6, 1934

Inventors
Abraham M. Babitch
& Gordon W. Hatty
By Blackmore, Spencer & Flint
Attorneys Patented Dec. 6, 1938

2,139,346

UNITED STATES PATENT OFFICE 2,139,346

COMBINED FUEL AND AIR PUMP

Abraham M. Babitch and Gordon W. Harry, Flint, Mich., assignors to General Motors Corporation, Detroit, Mich., a corporation of Delaware Application December 6, 1934, Serial No. 756,256

5 Claims. (Cl. 158—36.4)

This invention relates to fuel systems. It has been designed as an improvement in the system by means of which fuel is supplied to an engine of a motor vehicle from a supply tank or reservoir.

An object of the invention is to improve the mechanism by which fuel is delivered from the tank to the engine.

A further object is to prevent vapor lock in a system of the kind described, a system having, as a part thereof, a pump to lift the fuel from a tank.

As a further and more specific object the invention aims to avoid vapor lock by subjecting the air above the fuel in the tank and in the conduit to super-atmospheric pressure to thereby raise its vaporization temperature.

As a further object the invention aims to improve the delivery of fuel by using a secondary air pump to supply with air under pressure the space in the tank above the fuel, the secondary pump having strokes of an amplitude varying as do the strokes of the fuel pump.

Furthermore, changes in the fuel tank to cooperate with the pump constitute a part of the invention.

Other objects and advantages will be understood from the following description.

The invention is illustrated on the accompanying drawing in which

Figure 1:
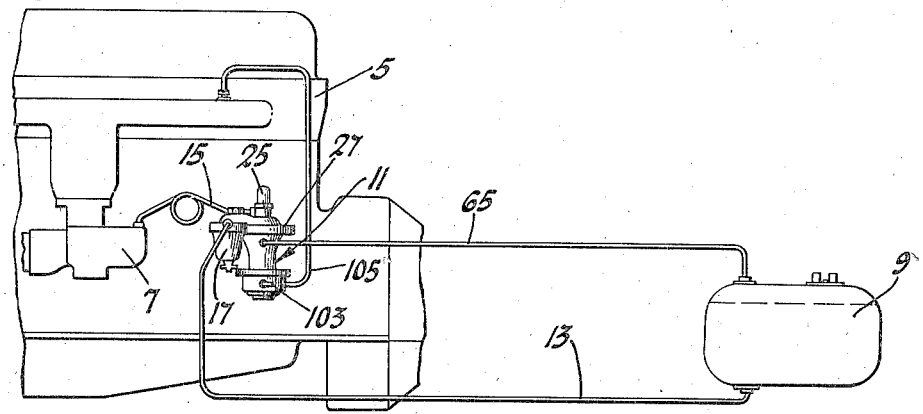
Fig. 1 is a view in side elevation of my novel fuel supply system.
Figure 2:
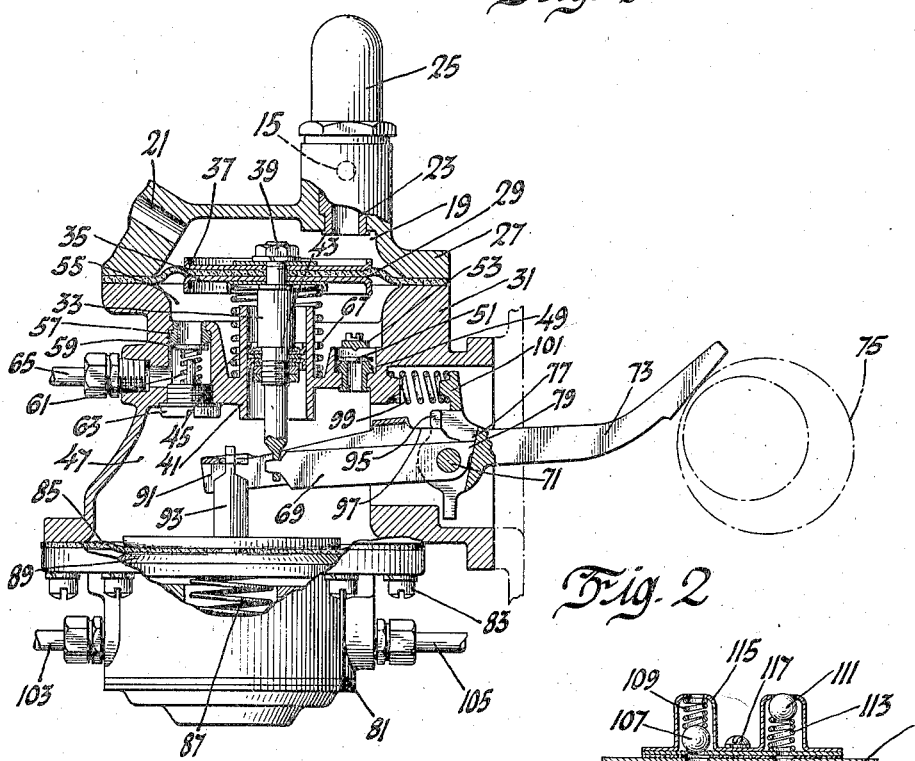
Fig. 2 is a view in vertical section of the pump element used in the system.
Figure 3:
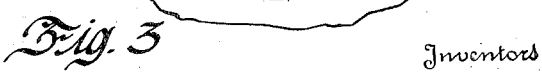
Fig. 3 is a vertical section through the valves used with the fuel reservoir.

Referring by reference characters to the drawing, a motor vehicle engine is designated by numeral 5. The carburetor 7 is to be supplied with fuel from tank 9. Numeral 11 represents a pump which is to lift the fuel from tank 9 through pipe 13 and which is to discharge it to the carburetor 7 by means of pipe 15.

Like fuel pumps in common use, the pump has a filter cup 17 which receives and filters the fuel coming through pipe 13 before delivering it to the fuel pump chamber 19 by way of passage 21. Although not shown in the drawing, there is of course an inlet valve controlling the flow through passage 21. The outlet valve through which fuel passes to pipe 15 is also not illustrated but the drawing does show its valve seat 23 and the air dome 25.

As will be seen, the upper casing member 27 is formed to support the filter cup, and is shaped to provide the pump chamber 19. A reciprocating flexible diaphragm constituting the movable pumping member is marked 29. It is clamped at its periphery between upper casing member 27 and, in the embodiment shown, an intermediate casing member 31. To the diaphragm 29 is centrally secured a stem 33 by means of discs 35 and 37 and nut 39. The stem extends downwardly through a central cylindrical portion 41 of casing member 31. The stem is reduced in diameter to form a shoulder 43 and suitable washers and nuts cooperate with the shoulder to hold oppositely facing flexible cups 45 engaging portion 41, thus preventing communication between the space 55 immediately beneath the diaphragm 29, and the main chamber 47 of casing member 31. Space 55 is the chamber of an air pump as will be explained. A valve seat 49 is engaged by inlet valve 51, a suitable stop for the valve being shown at 53. This valve admits air from chamber 47 to chamber 55. Another valve seat 57 seats an outlet valve 59 held against its seat by a spring 61 having at its lower abutment a threaded plug 63. Beneath the valve 59 and above the plug 63 is an opening for the reception of a conduit 65 which extends to the top of the fuel reservoir 9. The diaphragm 29 is reciprocated in its upward direction by a spring 67 engaging one of the diaphragm discs and a casing abutment adjacent the wall of the cylindrical part 41. The downward stroke of the diaphragm is made by a counterclockwise rotation of link 69 engaged at one end with the stem 33 and rotatably supported on a pivot 71. When the pump is assembled on the crank case of the engine, a lever 73 also pivoted on pin 71 projects into the crank case and into the path of movement of a cam 75. This lever has a face 77 to engage a face 79 on link 69 whereby the lever 73 and link 69 may rotate as a unit and pull down upon the stem 33 and diaphragm 29.

The pump illustrated has a third casing member 81 secured to the intermediate casing member 31 by fastening means 83. Between parts 81 and 31 is clamped a second diaphragm 85. Within casing 81 is a spring 87 pushing upwardly on diaphragm disc 89. The diaphragm is pushed down by a link 91 jointed to a stem 93 connected to the diaphragm and rotatably supported on pivot 71. A lug 95 on lever 73 is designed to engage a part 97 on link 91. To hold the lever 73 in contact with the cam 75, is a spring 99 engaging a casing part and an arm 101 of lever 73. The chamber beneath diaphragm 85, because of the movements of the diaphragm has a variable volume and may be used as a suction pump to pump air from the windshield cleaner. To that end it is provided with valves not shown and connected conduits 103 and 105. One of these pipes may be connected to the motor of the cleaner and the other to the engine manifold, if desired. In this way the pump beneath diaphragm 85 becomes a "booster". Ordinarily the manifold will provide the necessary suction to operate the windshield wiper. Under these circumstances the suction in the pump chamber will overcome spring 87 and separate the contact between parts 95 and 97. Whenever the vacuum of the manifold is insufficient to overcome spring 87, the contact at 95 takes place and the pump acts to draw air from the motor of the windshield cleaner and keep the cleaner in operation.

The action of the fuel pump is effected by the reciprocation of the diaphragm 29, the upward or discharge movement forcing fuel through pipe 15 to the carburetor, and the downward movement effected by the cam serving to draw fuel from the reservoir 9. The air pump beneath the diaphragm 29 takes air into chamber 55, when the diaphragm is moved up by spring 67, from the chamber 47, this chamber 47 being always at atmospheric pressure. When the cam pulls the diaphragm down air is forced out through pipe 65 to the upper part of reservoir 9. To render the action effective, obviously the cap for the tank 9 must be designed to permit pressure to build up above the fuel. To prevent the development of excessive pressure there is used a spring-loaded valve 107, the spring 109 arranged to yield at a predetermined pressure. To avoid the possibility of any appreciable suction in the tank there is provided an oppositely opening valve 111 held to its seat by a spring 113. These two valves may be conveniently assembled together by the use of a cover 115 and a fastening means 117.

It will be noted that the amplitude of the strokes of the air pump constituted by chamber 55 are identical with those of the fuel pump because both are effected by the movements of the same movable pumping member diaphragm 29. As a result, when the engine is taking a large supply of fuel and the demand on the pump is high, the air pump is cooperating by supplying air at a correspondingly high rate to the tank to aid the fuel pump in its task. The added pressure of air in the tank serves to raise the boiling point of the fuel to the end of preventing vaporization of the liquid fuel in hot weather and preventing vapor lock. By maintenance of a pressure of three or four pounds in the tank and pipe line the boiling point will be raised sufficiently to prevent vapor lock at any ordinary temperature encountered in summer driving.

It has been heretofore proposed to use the space beneath the fuel pump diaphragm as an air pump. The present invention is concerned with the use of such a pump to improve the action of the fuel pump itself, and to prevent vapor lock. In so designing the combined pumps, applicants have associated the suction of the fuel pump and the discharge of the air pump with the source of fuel supply, and this association has been accompanied with changes in the reservoir itself to facilitate the operation. In other words, for the best results, applicants have modified their fuel tank by the use of the two kinds of valves.

It will be understood that as a simpler embodiment, the invention may be carried into effect with a pump lacking the windshield booster formed by the casing member 81.

We claim:

1. In combination with an engine, a variable stroke fuel pump and a source of fuel, a conduit between said source and pump, means to impress upon the fuel in said source and conduit superatmospheric pressure to raise the boiling point of the fuel, said means comprising a variable stroke air pump, its strokes varying in amplitude as do the strokes of the fuel pump.

2. In combination with an engine, a variable stroke fuel pump and a source of fuel, a conduit between said source and pump, means to impress upon the fuel in said source and conduit superatmospheric pressure to raise the boiling point of the fuel, said means comprising an air pump, said fuel pump and air pump having a common movable pumping member and closure walls on either side of said member whereby the movable member and one closure wall forms a variable volume fuel pump and whereby the movable member and the other wall forms a variable volume air pump.

3. In combination, a fuel operated engine, a variable volume fuel pump for supplying said engine, said pump having a movable member, a reservoir for fuel, the space on one side of the movable member being a fuel pump chamber, the space on the other side being an air pump chamber, inlet and outlet valves associated with both chambers, conduit means for fuel from the reservoir to the inlet valve of the fuel pump, conduit means for fuel from the outlet valve of the fuel pump to the engine, conduit means for air from the outlet valve of the air pump to the space above the fuel in the reservoir, the inlet valve of the air pump affording communication with the atmosphere.

4. The invention defined by claim 3, said pump adapted to be mounted on the engine case together with mechanism for operating said diaphragm extending through registering openings in said pump and engine case wall, the air inlet receiving air at atmospheric pressure through said openings.

5. In combination, a fuel operated engine, a normally closed source of fuel, a fuel pump, a first conduit connecting said source of fuel and said pump, a second conduit connecting said pump and said engine, said pump having suction strokes of varying amplitude automatically determined in response to the varying needs of said engine for fuel, said suction strokes tending to lower the boiling point of said fuel in said closed source and said first conduit and means operable to apply pressure to said fuel to thereby raise the boiling point thereof, said last named means operating automatically in response to said suction pump strokes and having an efficiency substantially proportional to the amplitude of said strokes.

ABRAHAM M. BABITCH.
GORDON W. HARRY.